J. W. SACKETT.
CUTTER HEAD FOR SUCTION DREDGES.
APPLICATION FILED MAY 12, 1916.
1,226,386.
Patented May 15, 1917.
2 SHEETS—SHEET 1.
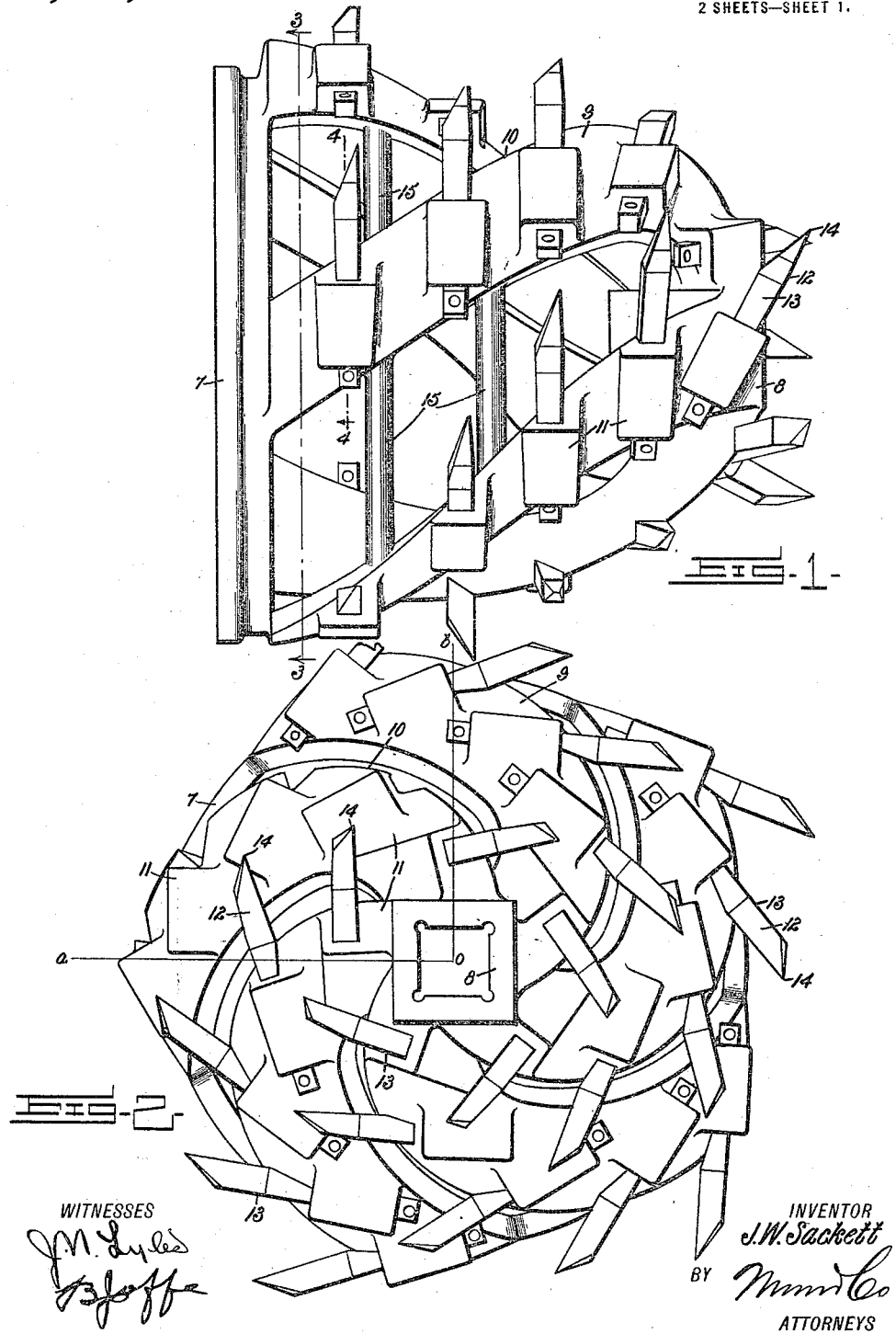

J. W. SACKETT.
CUTTER HEAD FOR SUCTION DREDGES.
APPLICATION FILED MAY 12, 1916.
1,226,386.
Patented May 15, 1917.
2 SHEETS—SHEET 2.
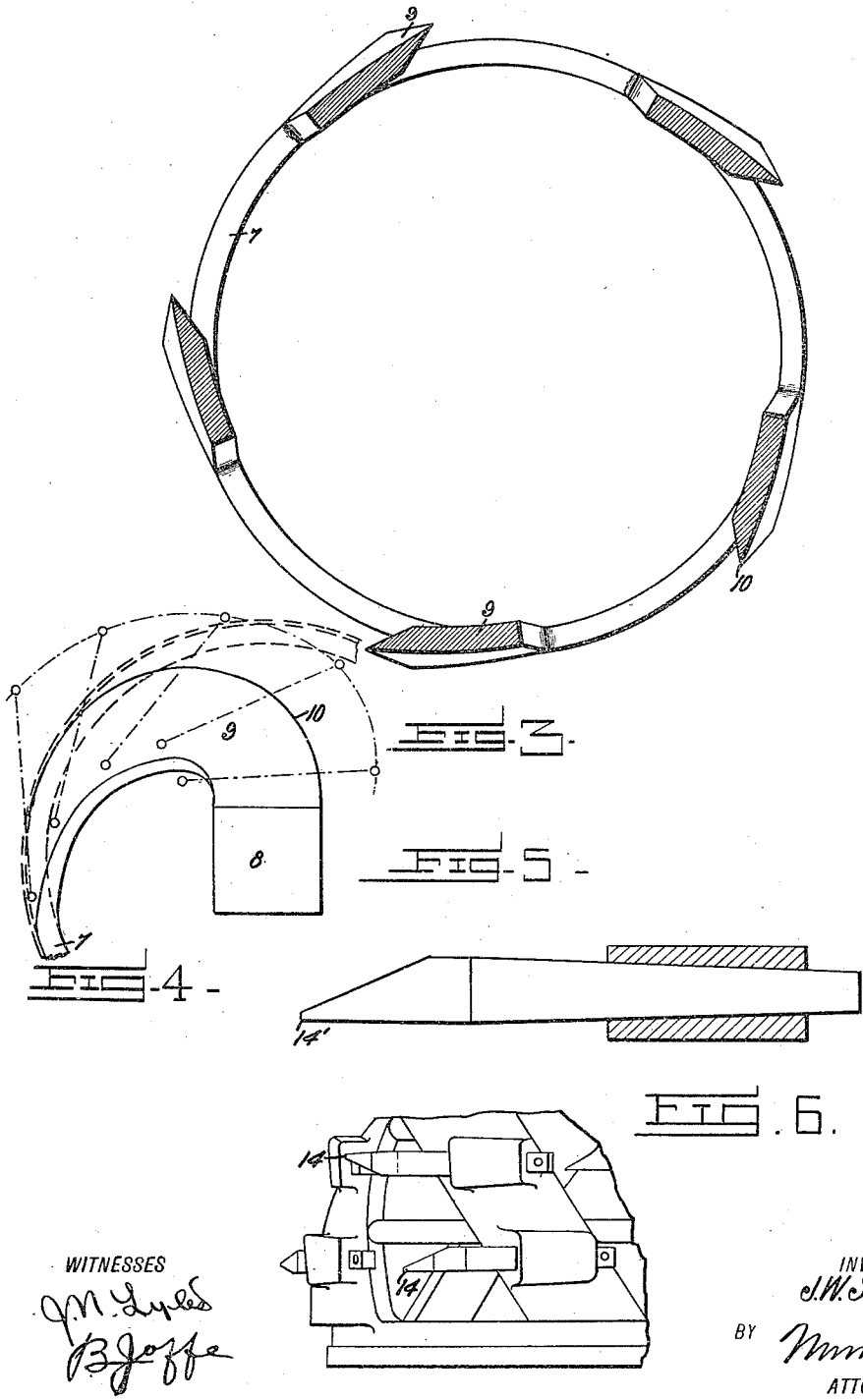
WITNESSES
INVENTOR
J. W. Sackett
BY
ATTORNEYS

UNITED STATES PATENT OFFICE.

JOHN WARREN SACKETT, OF JACKSONVILLE, FLORIDA.

CUTTER-HEAD FOR SUCTION-DREDGES.

1,226,386. Specification of Letters Patent. Patented May 15, 1917.

Application filed May 12, 1916. Serial No. 97,006.

*To all whom it may concern:*

Be it known that I, JOHN WARREN SACKETT, a citizen of the United States, and a resident of Jacksonville, in the county of Duval and State of Florida, have invented a new and Improved Cutter-Head for Suction-Dredges, of which the following is a full, clear, and exact description.

My invention relates to cutter heads for suction dredges. An object thereof is to provide a simple and efficient head so shaped that a greater length of the cutting blade engages the material of the bottom at the average depth of dredging, to facilitate the drawing of the loose material into the suction pipe. A further object of the invention is to provide a cutter head having cutting blades so arranged that there is no interval of time during the revolution of the cutter between successive engagements of the blades with the material of the bottom, whereby shocks and vibrations are minimized.

With the above and other objects in view, the nature of which will more fully appear as the description proceeds, the invention consists in the novel construction, combination and arrangement of parts as herein fully described, illustrated and claimed. In the accompanying drawings, forming part of the application, similar characters of reference indicate corresponding parts in all the views.

Figure 1 is an elevation of the cutter head embodying my invention;

Fig. 2 is a top plan, one row of teeth from one blade being eliminated to show the details of construction of the cutting edge of the blade;

Fig. 3 is a section on line 3—3, Fig. 1;

Fig. 4 is a diagrammatic view showing the curvature of the cutting edge on the similar curve on which the points or extremities of the teeth of the corresponding blade lie;

Fig. 5 is a modified form of a tooth in which the extremity of the tooth is pointed in a direction opposite to the teeth shown in Figs. 1 and 2; and Fig. 6 is a fragmentary elevation of the cutter head showing the head equipped with teeth pointing toward the nose of the cutter head and the teeth pointing away from the nose, as shown in Fig. 5.

Referring to the drawings, the cutter head, which is in the shape of a crown, comprises a rim 7 and a head or nose 8 co-axial with the rim and spaced therefrom, the two being united by curved blades 9 forming an integral part thereof. The blades are developed on a surface of double curvature, substantially that of a parabolic conoid. In consequence it so shapes the cutter head that a greater length of blade will engage the material of the bottom at the average depth of dredging. The blades 9 make a longer turn in the length of the cutter; consequently the cutting edge 10 of the successive blades overlap the preceding ones when projected on a plane. (See Fig. 2, lines $a$, $o$, $b$.) Therefore the cutting effect of the successive blades is continuous, and not intermittent, thereby relieving the device of undue strain.

To facilitate the work of the cutter head and adapt the same for the excavation of soft and loose rock, hard pan, etc., each blade on the outer surface is provided with a plurality of tooth sockets 11 spaced from each other, each socket receiving a tooth 12. The socket 11 tapers toward the rear of the blade to wedge the tapering portion of the tooth engaged in the socket caused by the resistance of the material engaged by the tooth during the motion of the cutter head. The sockets 11 are so formed that the back surface 13 of all the teeth within the sockets lie in planes parallel to the axis of the cutter head. That is to say, the teeth do not lie with their back surface parallel to the surface of the blade where they contact with the blade. The extremities 14 of the teeth on the same blade when wedged in their sockets lie in a curve similar to the curve of the cutting edge 10 and substantially parallel therewith. (See Fig. 4). The sockets of the teeth nearest to the nose are inclined to bring the extremities of the tooth engaged therein in front of the nose. These teeth on the cutter clear a path for the nose and thus prevent the forcing of the dredge backward.

The teeth sockets on the blades are set so that a portion of the cutting edge is cut away to accommodate the tooth engaged within the socket, whereby the cutting edge of the blade is in the shape of a series of teeth, as best seen in Fig. 1, particularly the blade included between the lines $a$—$o$—$b$, where the teeth are removed from the sockets. The adjacent blades on the cutter head are united by bracing bars 15 which prevent objects which are too large from passing into the cutter head and blocking the suction pipe, said bars also forming reinforcing members for the blades.

The cutter head as described will not only overcome the tendency to force the dredge backward, but may draw the dredge forward to an objectionable extent. To overcome such tendency if it develops, it is advisable to use different teeth on the cutter head, some having their extremities on the surface nearer to the cutter-head blades, and others, as shown in Fig. 5, the cutting points 14′ of which are on the down surface of the teeth, or the surface away from the nose. For instance, it may be advisable to have two teeth of Figs. 1 and 2 and three teeth of Fig. 5 in each row transverse to the axis of the cutter, or alternate rows of teeth in Figs. 1 and 2 and intermediate rows of teeth in Fig. 5. (See Fig. 6). The various combinations of such teeth depend considerably on the material to be worked upon.

I claim:

1. A cutter head for suction dredges having spaced cutting blades presenting a curved cutting edge, and removable teeth carried by each blade on the outer surface of the blade with their back surfaces in planes parallel to the axis of the head, said teeth projecting ahead of the corresponding cutting edge, and the extremities of the teeth on the same blade lying in a curvature substantially similar to the cutting edge of the blade.

2. A cutter head for suction dredges having curved cutting blades the cutting edges of which are developed on a surface of double curvature substantially that of the parabolic conoid, tooth sockets on said blades, and teeth removably associated with the sockets, the cutting edge of the blade under the teeth being cleared for the teeth, whereby the cutting edge of the blade is toothed.

3. A cutter head for suction dredges in the shape of a crown having curved blades, the cutting edges of which are developed substantially on a surface of double curvature, and teeth on the outer surface of each blade and removably associated with said blades, said teeth having their back surfaces in planes parallel to the axis of the head.

4. A cutter head for suction dredges having a rim, a nose co-axial with the rim and spaced therefrom, curved cutting blades from the rim to the nose, the curvature of the cutting edge of the blades being developed substantially on a parabolic conoid, teeth sockets on the outer surface of said blades, and teeth removably associated with said sockets, said teeth being so located on said blades that their back surfaces are in planes parallel with the axis of the head.

5. A cutter head for suction dredges comprising a rim, a nose co-axial therewith and spaced from the rim, curved blades from the rim to the nose each presenting a cutting edge of double curvature, teeth on the outer surface of the blades and detachably associated with said blades and having their extremities ahead of the cutting edge, the extremities of the teeth close to the nose being in front of the nose to clear the way for the nose, the extremities of the teeth on the same blade lying in a curvature substantially similar to the cutting edge of the blade.

6. A cutter head for suction dredges having curved cutting blades, the cutting edge of each of which is toothed, and teeth located removably on the blades in alinement with the indentures of the cutting blades and ahead of the cutting edge of the blade.

7. A cutter head for suction dredges having cutting blades the cutting edges of which are deflected on a curve of double curvature, said cutting edges being indented at intervals, said blades having sockets, and teeth removably associated with the sockets, said teeth registering with the indentures of the blades and projecting ahead of the cutting edge.

8. A cutter head for suction dredges having curved cutting blades, pointed teeth carried by the blades and extending ahead of the cutting edge thereof, the points of some of said teeth pointing toward the top of the head and of others toward the bottom.

9. A cutter head for suction dredges having a rim, a nose co-axial with the rim and spaced therefrom, curved cutting blades from the rim to the nose, and pointed teeth carried by the blades with the points ahead of the cutting edge, said teeth on the blades forming circular rows about the head, the teeth in successive rows having their points directed oppositely.

JOHN WARREN SACKETT.

Copies of this patent may be obtained for five cents each, by addressing the "Commissioner of Patents, Washington, D. C."